United States Patent
Karabin et al.

(10) Patent No.: US 7,957,902 B2
(45) Date of Patent: Jun. 7, 2011

(54) METHOD AND SYSTEM FOR DETERMINING CLOUD-TO-GROUND LIGHTNING INFORMATION

(75) Inventors: Christopher R. Karabin, White Plains, MD (US); Robert M. Daily, Swann Point, MD (US); Shad M. Reese, Indian Head, MD (US); Lothar H. Ruhnke, Bluffton, SC (US); Vladislav Mazur, Norman, OK (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 500 days.

(21) Appl. No.: 12/221,148

(22) Filed: Jul. 24, 2008

(65) Prior Publication Data

US 2010/0023267 A1    Jan. 28, 2010

(51) Int. Cl.
*G06F 19/00* (2011.01)
(52) U.S. Cl. ............... 702/4; 702/59; 702/66; 342/460; 342/465; 324/72; 324/76.33; 324/76.11; 340/601
(58) Field of Classification Search ............... 702/4, 59, 702/66; 342/460, 465, 388, 387; 324/72, 324/76.33, 76.11; 340/573.1, 601; 73/170.24
See application file for complete search history.

(56) References Cited

U.S. PATENT DOCUMENTS

| | | | |
|---|---|---|---|
| 3,715,660 A * | 2/1973 | Ruhnke | 324/72 |
| 4,115,732 A | 9/1978 | Krider et al. | |
| 4,245,190 A | 1/1981 | Krider et al. | |
| 4,672,305 A | 6/1987 | Coleman | |
| 4,792,806 A | 12/1988 | Bent et al. | |
| 4,803,421 A * | 2/1989 | Ostrander | 324/72 |
| 4,806,851 A | 2/1989 | Krider et al. | |
| 4,873,483 A * | 10/1989 | Ostrander | 324/72 |
| 5,036,334 A * | 7/1991 | Henderson et al. | 342/460 |
| 5,235,341 A * | 8/1993 | Effland et al. | 342/460 |
| 5,263,368 A * | 11/1993 | Breitmeier et al. | 73/170.24 |
| 5,295,072 A * | 3/1994 | Stevens et al. | 702/4 |
| 5,771,020 A * | 6/1998 | Markson et al. | 342/460 |
| 6,246,367 B1 * | 6/2001 | Markson et al. | 342/460 |
| 6,420,862 B2 * | 7/2002 | Medelius et al. | 324/72 |
| 6,768,946 B2 | 7/2004 | Okabe et al. | |
| 6,791,311 B2 * | 9/2004 | Murphy et al. | 324/72 |
| 6,828,911 B2 * | 12/2004 | Jones et al. | 340/601 |
| 6,868,339 B2 | 3/2005 | Murphy et al. | |
| 6,961,662 B2 | 11/2005 | Murphy | |
| 7,049,972 B2 * | 5/2006 | Fabian et al. | 340/601 |

(Continued)

FOREIGN PATENT DOCUMENTS

WO PCT/US2008/011659    10/2008

*Primary Examiner* — Carol S Tsai
(74) *Attorney, Agent, or Firm* — Fredric J. Zimmerman

(57) ABSTRACT

A real-time, multi-sensor local-area lightning detection network system. The system uses waveform indicative of electrostatic field changes with respect to time is generated at each of N locations due to a cloud-to-ground lightning strike occurring in the vicinity of the N locations. Each waveform is integrated to generate a corresponding electric field associated with a corresponding one of the locations. A mathematical relationship is used to determine a ground surface location of the lightning strike, height of the lightning strike, and charge per unit length of the lightning strike using each electric field generated during integration of the waveforms.

20 Claims, 2 Drawing Sheets

U.S. PATENT DOCUMENTS

| | | | |
|---|---|---|---|
| 7,171,308 B2* | 1/2007 | Campbell | 702/4 |
| 7,266,455 B2* | 9/2007 | Kahkoska | 702/4 |
| 7,411,513 B1* | 8/2008 | Karamanian et al. | 340/601 |
| 7,869,953 B1* | 1/2011 | Kelly et al. | 702/4 |
| 2003/0187580 A1* | 10/2003 | Okabe et al. | 702/4 |
| 2005/0046574 A1* | 3/2005 | Fabian et al. | 340/573.1 |
| 2006/0206268 A1* | 9/2006 | Kahkoska | 702/4 |
| 2008/0122424 A1* | 5/2008 | Zhang et al. | 324/72 |
| 2008/0262732 A1* | 10/2008 | Davis et al. | 702/4 |
| 2009/0281730 A1* | 11/2009 | Said et al. | 702/4 |

* cited by examiner

METHOD AND SYSTEM FOR DETERMINING CLOUD-TO-GROUND LIGHTNING INFORMATION

ORIGIN OF THE INVENTION

The invention described herein was made in the performance of official duties by employees of the Department of the Navy and the Department of Commerce, and may be manufactured, used, licensed by or for the Government for any governmental purpose without payment of any royalties thereon.

FIELD OF THE INVENTION

The invention relates generally to lightning detection systems, and more particularly to a method and system for determining information about cloud-to-ground lightning strikes.

BACKGROUND OF THE INVENTION

Information about cloud-to-ground lightning strikes is important for a variety of safety and research reasons. For example, it is known that intense downdrafts or microbursts follow lightning-producing updrafts. Precise knowledge of lightning strikes, accordingly, can serve as a predictor for the locations of possible microbursts. This type of information, for example, would provide safer air traffic control in order to protect planes from such microbursts. Lightning strike information is typically generated using lightning detection systems that use magnetic field sensors to detect a radiation component or an induction component of a lightning strike.

In terms of scientific research, any additional knowledge about a lightning strike could prove beneficial in existing or future applications requiring knowledge about severe weather conditions.

SUMMARY OF THE INVENTION

Accordingly, it is an object of the present invention to provide a method and system for determining real-time information about cloud-to-ground lightning strikes as line segments by calculating changes in the electrostatic field.

Another object of the present invention is to provide a method and system for determining a precise ground location of a cloud-to-ground lightning strike in the near-field based on specific assumptions.

A further object of the present invention is to provide a method and system where each solution for each station has about tens of meters (or less) of uncertainty compared to conventional technology, which typically has hundreds of meters of uncertainty, and thus a significant reduction.

Other objects and advantages of the present invention will become more obvious hereinafter in the specification and drawings.

In accordance with the present invention, a method and system are provided for determining real-time information by treating cloud-to-ground lightning strikes as line segments. A waveform indicative of the derivative of the electrostatic field with respect to time is generated at each of N locations due to a cloud-to-ground lightning strike occurring in the vicinity of the N locations. In the present invention, there must be at least four such locations. Each waveform is integrated to generate a corresponding electric field associated with a corresponding one of the locations. A mathematical relationship is used to determine a ground surface location of the lightning strike, height of the lightning strike, and charge per unit length of the lightning strike using each electric field generated by integration of the waveforms.

BRIEF DESCRIPTION OF THE DRAWINGS

Other objects, features and advantages of the present invention will become apparent upon reference to the following description of the exemplary embodiments and to the drawings, where corresponding reference characters indicate corresponding parts throughout the several views of the drawings and wherein.

DETAILED DESCRIPTION OF THE INVENTION

Figure 1:
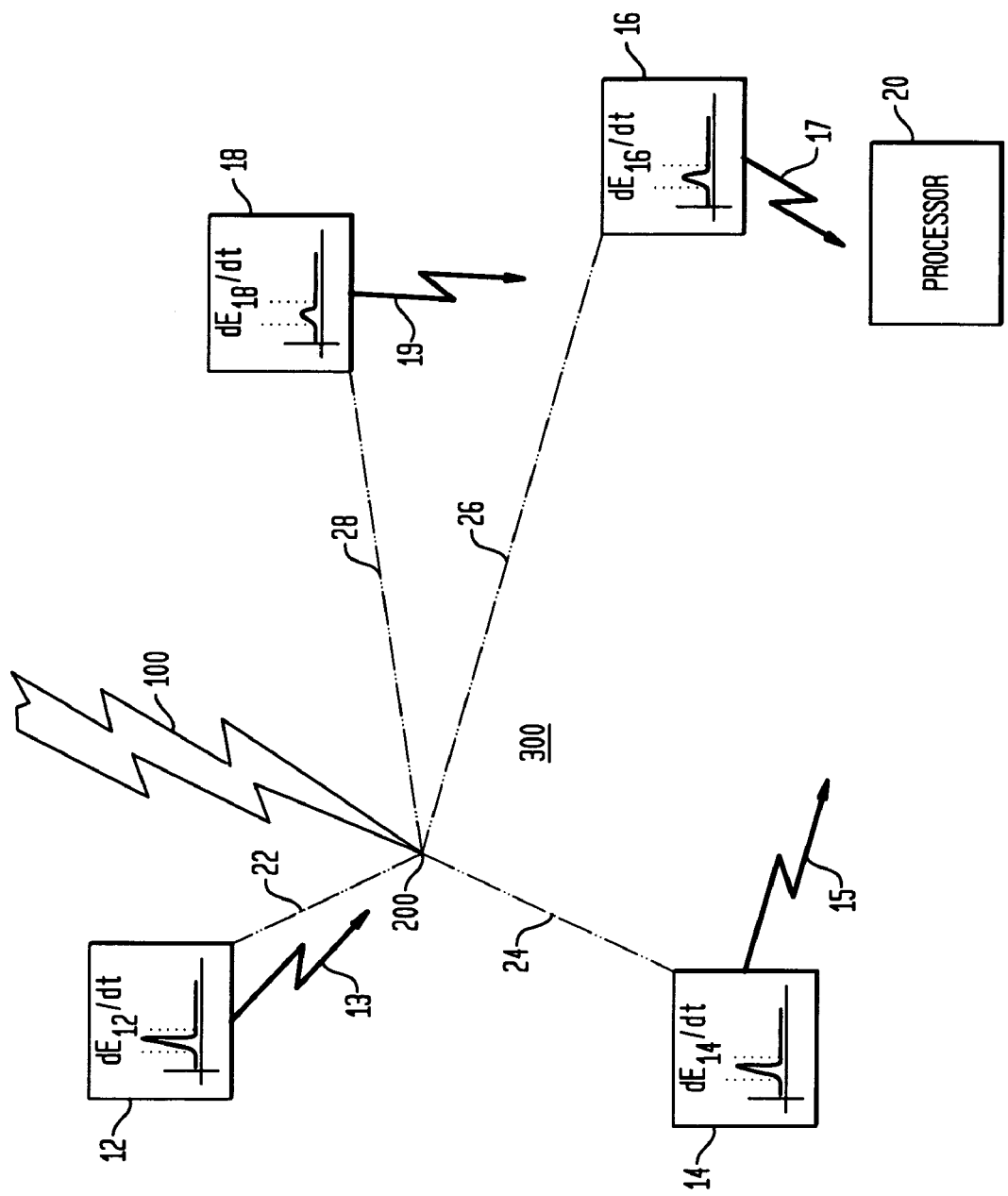
FIG. 1 is a schematic view of the system for determining cloud-to-ground lightning information in accordance with an exemplary embodiment of the present invention.

Referring now to the drawings and more particularly to FIG. 1, an overview of a system for determining real-time lightning information with improved accuracy in accordance with the present invention is illustrated. As will be described herein, the information will describe the ground strike location 200 of a cloud-to-ground lightning strike 100, the vertical extent or height of lightning strike 100, and the electrical charge per unit (i.e., height) of lightning strike 100. All of this information is obtained by the same processing system/method. Accordingly, the present invention advances the lightning detection state-of-the-art by providing comprehensive real-time data about an electrostatic field component of a lightning strike 100 as a line segment in the near field as opposed to the mere detection or location thereof using magnetic field sensors to detect a radiation component or an inductive component of a lightning strike or, alternatively, simply using an electrostatic field to measure amplitude and infer distance.

In general, the present invention monitor changes in a local electrostatic field with respect to time at each of a plurality of spaced-apart stations located on or near a ground surface 300 (e.g., the plane of the paper used to illustrate FIG. 1). For reasons that will be explained further below, in an exemplary embodiment, at least four stations are used in the present invention. More stations may be used to increase reliability, that is, the margin of error decreases with the use of more stations. Accordingly, FIG. 1 illustrates stations 12, 14, 16 and 18 in a spaced-apart arrangement. In an exemplary embodiment, no station is less than one kilometer from another station in order to be effective. Stations 12-18, that is, first structures, may be located on ground surface 300 or a relatively short distance above ground surface 300 (e.g., on a pedestal, building, cell tower, etc.) without departing from the scope of the present invention, provided each such station can monitor local electrostatic field changes. The local electrostatic field changes monitored (e.g., continuously or during storm periods) by stations 12-18 are indicated in FIG. 1 by $dE_{12}/dt$, $dE_{14}/dt$, $dE_{16}/dt$ and $dE_{18}/dt$, respectively.

In the illustrated example, the distance between each of stations 12-18 to ground strike location 200 is indicated by a respective dashed line 22, 24, 26 and 28 where the distance "D" of each line is such that $D_{22}<D_{24}<D_{26}<D_{28}$. When lightning strike 100 occurs, each of the stations 12-18 measures an electrostatic component of the lightning strike so that the local (near-field) electrostatic field monitored at each of the stations 12-18 may experience a spike or peak as evidenced in each of the waveforms indicative of the corresponding field change dE/dt at each station. Since electrostatic field amplitude decreases with distance from a lightning strike, the peak amplitude of each of the waveforms $dE_{12}/dt$, $dE_{14}/dt$, $dE_{16}/dt$ and $dE_{18}/dt$ is in correspondence with the distance between the respective station and-ground strike location 200. This characteristic is apparent in each of the dE/dt waveforms in the exemplary embodiment shown in FIG. 1 where the peak amplitude at station 12 is greatest and the peak amplitude at station 18 is smallest. This amplitude difference is used in the present invention to provide information about lightning strike 100.

To accurately characterize lightning strike 100, it is best to use only the portion of each dE/dt that is related to lightning strike 100. The "relevant portion" (as it will be referred to hereinafter) of each dE/dt waveform related to lightning strike 100 includes a brief portion of the waveform both before and after the occurrence of a dE/dt waveform peak. To select the relevant portion, a threshold criteria is applied to each monitored dE/dt waveform so that just the peak region (i.e., waveform data to include the waveform peak and brief periods before and after the peak) of the monitored electrostatic field changes is processed. Such identified peak region referred to as thresholding/windowing is indicated in FIG. 1 by the vertical dashed lines on each dE/dt waveform where the waveform information between the dashed lines contains information related to lightning strike 100. Accordingly, the stations or first structures 12-18 generate a respective waveform indicative of electrostatic field changes with respect to time at each station location.

The relevant portion of each dE/dt waveform (i.e., between the vertical dashed lines) from stations 12-18 is integrated by a processor 20 sometimes-referred to as a "second structure," that is, in an exemplary embodiment, remotely located with respect to stations 12-18. In such a case, the relevant portion of each dE/dt waveform may be transmitted over a wired or wireless transmission system (not shown) to a (remotely located) processor 20, such that the stations 12-18 are coupled to the processor or second structure 20, as indicated by respective transmission arrows 13, 15, 17 and 19. The processor 20, in part, may perform an integration function as well as a function to solve simultaneous equations. Alternatively, in a different exemplary embodiment, and without departing from the scope of the present invention, each station 12-18 may include its own processor component not shown), which is separate from the controller 38 and different from processor 20, in order to integrate the relevant portion of its dE/dt waveform where the results of such integration may then be transmitted to the (remotely located) processor 20, which may, in part, function to solve simultaneous equations relating to determining a ground surface location of the lightning strike, height of the lightning strike, charge per unit length of the lightning strike and other related information.

Integrating the relevant portion of a dE/dt waveform yields an electric field measurement "E" at the particular one of stations 12-18 due to lightning strike 100. The resulting four electric field measurements (e.g., $E_{12}$, $E_{14}$, $E_{16}$, and $E_{18}$ in the illustrated example) are processed substantially simultaneously to provide coordinates of ground strike location 200 relative to stations 12-18, the vertical extent or height of lightning strike 100, and the electric charge per unit length (i.e., height) of lightning strike 100. Accordingly, E is calculated essentially independent of time of arrival of the electrostatic signal at a station 12-18. In general, the electric field in $E_N$ of an N-th station may be defined as follows:

$$E_N = \frac{q}{2\pi\varepsilon} * \left( \frac{1}{d_N} - \frac{1}{\sqrt{d_N^2 + z^2}} \right)$$

where $d_N = \sqrt{x_N^2 + y_N^2}$.

In this electric field relationship $x_N$ and $y_N$ are the coordinates of ground strike location 200 relative to the N-th station, z is the height of lightning strike 100 where the lightning strike may be treated as a line segment not a point charge, q is the electric charge per unit length (height) of lightning strike 100, and $\varepsilon$ is the permittivity of the ambient atmosphere through which lightning strike 100 propagates. The above electric field relationship is developed based on the following exemplary assumptions:

lightning strike propagates through a "channel" defined by a vertical line, that is, the lightning strike is treated as a line segment not a conventional point charge, the charge q per unit length is constant along the lightning "channel", there is no branching of the lightning "channel", and only the first stroke-to-ground is used.

Figure 2:
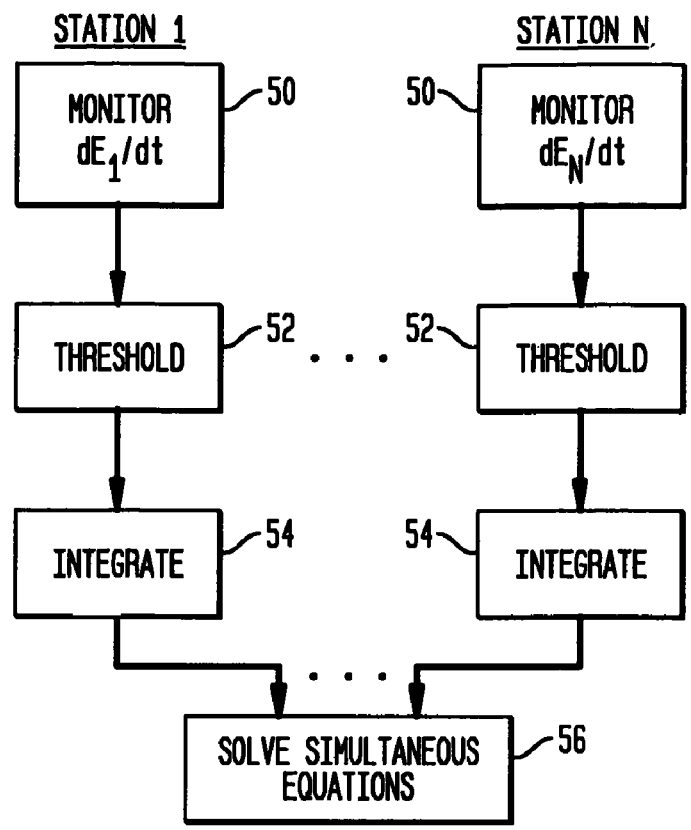
FIG. 2 is a flow diagram of the general method used to determine cloud-to-ground information in accordance with the present invention.

In an exemplary embodiment, processor 20 may implement any multiple-equation/multiple-unknown methodology to solve, for example, simultaneously, at least the four $E_N$ equations having four unknowns (i.e., $x_N$, $y_N$, z, q). The choice of a particular solution technique is within the skill in the art and is not a limitation of the present invention. The generalized method of the present invention is illustrated in the flow diagram presented in FIG. 2. Stations 1 through N will perform the same processing as described above. By way of example in an exemplary embodiment, each station monitors (step 50) electrostatic field changes dE/dt locally, that is, an electronic component in the near field compared to conventional technology that may use magnetic field sensors to detect a radiation component and/or an induction component of a lightning strike. When a lightning strike occurs, a thresholding technique (step 52) is applied to the locally-monitored dE/dt waveform to select the relevant portion thereof, that is, relevant portion of dE/dt. In an exemplary embodiment, integration (step 54) of the relevant portion of each dE/dt waveform may be performed as part of the particular station's 12-18 processing function, for example, as shown in FIG. 2. In another exemplary embodiment, integration may be performed by processor 20, which is separate and may be remotely located from the stations 12-18, or, in another exemplary embodiment, more stations 12-N. Since, in an exemplary embodiment, there are four unknowns in the electric field relationships, data from four stations is required in the present invention so that a simultaneous solution technique can be applied (step 56). Based on this system, each solution for each station 12-18 has about tens of meters (or less) of uncertainty compared to conventional technology, which has hundreds of meters of uncertainty, and thus a significant reduction.

Figure 3:
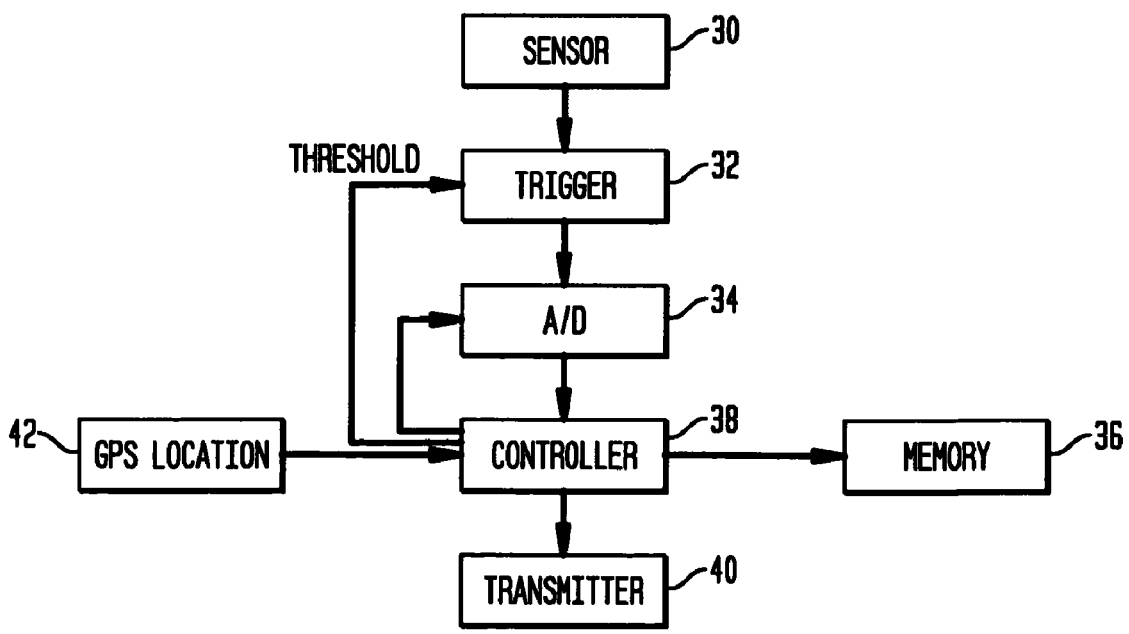
FIG. 3 is a block diagram of the system components at a lightning monitoring station in accordance with an exemplary embodiment of the present invention.

The hardware required at a monitoring station may vary depending on system design. In an exemplary embodiment, one possible station design is illustrated in FIG. 3 where an electrostatic field sensor 30 is used to "continuously" sense the local electrostatic field. In an exemplary embodiment, the electrostatic field sensor 30 may be a short modified whip antenna. As used here, "continuously" refers to any time period of interest (e.g., all the time, during the summer/thunderstorm months, when a storm is approaching, etc.). As used here, "locally" refers to "at each stations's electric field sensor," that is, the antenna at each station installation, so "locally" is not a distance. Further, the output of sensor 30 is supplied to a trigger circuit 32 that, in turn, is supplied with a threshold level indicative of a lightning strike in the vicinity of the sensor 30. In an exemplary embodiment, the trigger circuit 32 may be a comparator with an adjustable trigger level and digital trigger output. In different exemplary embodiments, the threshold criteria may be based on the rate of change (or slope of dE/dt), or may be based on a particular peak amplitude of dE/dt without departing from the scope of the present invention. In either exemplary embodiment, a lightning event is indicated when the threshold level is achieved. The output of sensor 30 via the trigger circuit 32 is passed to an analog-to-digital (A/D) converter 34 for digitization. In an exemplary embodiment, the A/D converter 34 may be a single channel with 16 bit resolution and 10 microseconds time resolution. The entire dE/dt waveform or just the relevant portion thereof due to a lightning strike is digitized by the A/D converter 34. In an exemplary embodiment, the digitized waveform data may be recorded and stored "on station" 12-18 in a memory unit 36, for example, in an exemplary embodiment, a flashcard memory 36. The A/D converter 34 and the memory unit 36 are sometimes jointly referred to as a "monitoring structure." Control of such data storage, as well as control of A/D converter 34 and the threshold level supplied to trigger circuit 32, may be provided by an "on station" controller 38. In an exemplary embodiment, the controller 38 may be enabled to record 500 readings of an lightning electric field signal where 100 readings are pre-trigger and 400 readings are post trigger. A transmitter 40 is used to relay, generally, just the digitized, relevant portion of the dE/dt waveform data to a remotely located processor 20.

Since the present invention determines ground strike location 200 relative to each particular station, absolute geographic coordinates of ground strike location 200 may be readily determined if the absolute geographic coordinates of each station are known. Accordingly, in an exemplary embodiment, each station may also include a GPS location unit 42 for providing a GPS location of the station, and more particularly, the location of the electric field sensor, that is, antenna, as well as providing a date and a time, for example, in an exemplary embodiment, a time accurate to 1 milliseconds. This information may be provided to the controller 38 for final transmission to the remotely located processor (e.g., processor 20) for determining coincidences between the reading of all stations. The GPS is used to locate the station and, more specifically, the antenna. The GPS is also used to synchronize the timing circuitry (clocks) in each station. The GPS location may be known in advance or determined by "on station" GPS location unit/electronics 42 (not shown in detail) as would be well understood in the art. In an exemplary embodiment, the GPS location unit may provide a computed location of each station 12-18 with an accuracy within 1 meter of the actual location of each station.

The advantages of the present invention are numerous. Precise lightning strike location, vertical extent, and charge intensity are simultaneously determined. Based on this system, each solution for each station 12-18 has about tens of meters (or less) of uncertainty compared to conventional technology, which has hundreds of meters of uncertainty, and thus a significant reduction. Such cloud-to-ground lightning information is of value to variety of safety and research applications.

Although the invention has been described relative to specific embodiments thereof, there are numerous variations and modifications that may be readily apparent to those skilled in the art in light of the above teachings. It is therefore to be understood that, within the scope of the appended claims, the invention may be practiced other than as specifically described.

Finally, any numerical parameters set forth in the specification and attached claims are approximations (for example, by using the term "about") that may vary depending upon the desired properties sought to be obtained by the present invention.

At the very least, and not as an attempt to limit the application of the doctrine of equivalents to the scope of the claims, each numerical parameter should at least be construed in light of the number of significant digits and by applying ordinary rounding.

What is claimed as new and desired to be secured by Letters Patent of the United States is:

1. A system for determining information about cloud-to-ground lightning strikes, comprising:
    a first structure for generating a waveform indicative of electrostatic field changes with respect to time at each of N locations due to a cloud-to-ground lightning strike occurring in the vicinity of said N locations, wherein N is at least 4; and
    second structure for integrating each said waveform to generate a corresponding electric field associated with a corresponding one of said N locations, and for determining a ground surface location of the lightning strike, height of the lightning strike, and charge per unit length of the lightning strike using each said corresponding electric field so-generated.

2. The system as in claim 1, wherein said second structure is remotely located with respect to each of said first structure.

3. The system as in claim 1, wherein each of said first structure include a transmitter to transmit each said waveform to said second structure.

4. The system as in claim 1, wherein each said waveform is digitized.

5. A system for determining information about cloud-to-ground lightning strikes, comprising:
    a first structure for generating a waveform indicative of electrostatic field changes with respect to time at each of N spaced-apart locations due to a cloud-to-ground lightning strike occurring in the vicinity of each of said N locations, wherein N is at least 4;
    a processor being coupled to said first structure for integrating each said waveform to generate a corresponding electric field $E_N$, and for simultaneously solving N equations with each of said N equations being of the form $$E_N = \frac{q}{2\pi\varepsilon} * \left(\frac{1}{d_N} - \frac{1}{\sqrt{d_N^2 + z^2}}\right)$$

where $d_N = \sqrt{x_N^2 + y_N^2}$,
    wherein said $x_N$ and said $y_N$ define coordinates of a ground surface location of the lightning strike relative to an N-th one of said N locations,
    wherein said z is the height of the lightning strike,
    wherein said q is the charge per unit length of the lightning strike, and
    wherein said $\varepsilon$ is the permittivity of the ambient atmosphere through which the lightning strike propagates.

6. The system as in claim 5, wherein said first structure for generating comprises an electrostatic field sensor positioned at each of said N locations for continuously sensing an electrostatic field in the vicinity thereof, a monitoring structure coupled to said electrostatic field sensor for recording said waveform when said electrostatic field so-sensed exceeds a threshold, and a transmitter coupled to said monitoring structure for transmitting said waveform so-recorded.

7. The system as in claim 6, wherein said monitoring structure includes an A/D converter to digitize said waveform prior to the recording thereof.

8. The system as in claim 6, wherein said monitoring structure includes a memory to store said waveform.

9. A method of determining information about cloud-to-ground lightning strikes, comprising:
   providing at least four spaced-apart stations near a ground surface;
   generating, at each of said at least four spaced-apart stations, a waveform indicative of electrostatic field changes with respect to time due to a lightning strike occurring in the vicinity of said N stations;
   integrating each said waveform for generating a corresponding electric field; and
   determining a ground surface location of the lightning strike, height of the lightning strike, and charge per unit length of the lightning strike by using each of said corresponding electric field,
   wherein the lightning strike is a cloud-to-ground lightning strike.

10. The method according to claim 9, wherein said integrating and said determining occur at a location separated from said at least four spaced-apart stations.

11. The method according to claim 9, further comprising transmitting each said waveform to a location where said integrating and said determining take place.

12. The method according to claim 9, further comprising digitizing each said waveform.

13. The method according to claim 9, further comprising providing a GPS location for each of said N stations,
   wherein said ground surface location of the lightning strike is determined relative to said GPS locations.

14. A method of determining information about cloud-to-ground lightning strikes, comprising:
   providing N spaced-apart stations near a ground surface wherein N is at least 4;
   generating, at each of said N spaced-apart stations, a waveform indicative of electrostatic field changes with respect to time due to a lightning strike occurring in the vicinity of said N spaced-apart stations,
   wherein said lightning strike is a cloud-to-ground lightning strike;
   integrating each said waveform for generating a corresponding electric field $E_N$; and
   determining a ground surface location of the lightning strike, height of the lightning strike, and charge per unit length of the lightning strike, by simultaneously solving N equations with each of said N equations being of the form $$E_N = \frac{q}{2\pi\varepsilon} * \left( \frac{1}{d_N} - \frac{1}{\sqrt{d_N^2 + z^2}} \right)$$

where $d_N = \sqrt{x_N^2 + y_N^2}$,
   wherein said $x_N$ and said $y_N$ define coordinates of a ground surface location of the lightning strike relative to an N-th one of said N locations,
   wherein said z is the height of the lightning strike,
   wherein said q is the charge per unit length of the lightning, and
   wherein said $\varepsilon$ is the permittivity of the ambient atmosphere through which the lightning strike propagates.

15. The method according to claim 14, wherein said generating occurs only when said electrostatic field changes exceed a threshold.

16. The method according to claim 14, wherein said integrating occurs only when an amplitude of said waveform exceeds a threshold.

17. The method according to claim 14, further comprising recording each said waveform at each of said N stations.

18. The method according to claim 14, further comprising transmitting said waveform from each of said N spaced-apart stations to a processing location,
   wherein said determining occurs at said processing location that is remote with respect to each of said N spaced-apart stations.

19. The method according to claim 14, further comprising providing a GPS location for each of said N spaced-apart stations,
   wherein said ground surface location of the lightning strike is determined relative to said GPS locations.

20. A system for determining information about cloud-to-ground lightning strikes, comprising:
   first structures for generating a waveform indicative of electrostatic field changes with respect to time at each of N locations due to a cloud-to-ground lightning strike occurring in the vicinity of said N locations, wherein N is at least 4,
      wherein said first structures each include a processor component, said processor component integrates each said waveform to generate a corresponding electric field associated with a corresponding one of said N locations; and
   a second structure for determining a ground surface location of the lightning strike, height of the lightning strike, and charge per unit length of the lightning strike using each said corresponding electric field so-generated.

* * * * *